US008280554B2

(12) United States Patent
Bergman, Jr. et al.

(10) Patent No.: US 8,280,554 B2
(45) Date of Patent: Oct. 2, 2012

(54) SYSTEM FOR PREVENTING UNNECESSARY SHUTDOWN OF A HIGH-PURITY GAS PRODUCTION PLANT

(75) Inventors: Thomas John Bergman, Jr., Clarence Center, NY (US); Rick Boyer, Garland, TX (US); Sandro Di Santo, Richardson, TX (US); Michael Henry Hawke, Kenmore, NY (US); Keith Randall Pace, E. Amherst, NY (US); Thomas Robert Schulte, Grand Island, NY (US); Brian Donald Warrick, Colorado Springs, CO (US)

(73) Assignee: Praxair Technology, Inc., Danbury, CT (US)

( * ) Notice: Subject to any disclaimer, the term of this patent is extended or adjusted under 35 U.S.C. 154(b) by 649 days.

(21) Appl. No.: 12/263,788

(22) Filed: Nov. 3, 2008

(65) Prior Publication Data
US 2009/0125127 A1 May 14, 2009

Related U.S. Application Data

(60) Provisional application No. 60/986,782, filed on Nov. 9, 2007.

(51) Int. Cl.
*G05B 19/048* (2006.01)

(52) U.S. Cl. ........ 700/271; 700/266; 700/268; 700/273; 702/31; 702/32; 340/584; 422/62

(58) Field of Classification Search .................... 422/62; 700/266, 268, 269–273; 340/584; 702/31, 702/32
See application file for complete search history.

(56) References Cited

U.S. PATENT DOCUMENTS

| | | | |
|---|---|---|---|
| 4,816,043 A | 3/1989 | Harrison | |
| 4,832,711 A | 5/1989 | Christel, Jr. et al. | |
| 5,172,099 A | 12/1992 | Glaser | |
| 5,663,899 A | 9/1997 | Zvonar et al. | |
| 6,068,685 A | 5/2000 | Lorimer et al. | |
| 6,156,105 A | 12/2000 | Lorimer et al. | |
| 6,232,204 B1 | 5/2001 | Lorimer et al. | |
| 6,363,330 B1 | 3/2002 | Alag et al. | |
| 6,398,846 B1 | 6/2002 | Lorimer et al. | |
| 7,007,402 B1 * | 3/2006 | Gillette | 34/80 |
| 2006/0000850 A1 * | 1/2006 | Vincent et al. | 222/3 |

* cited by examiner

*Primary Examiner* — Jill Warden
*Assistant Examiner* — Shogo Sasaki
(74) *Attorney, Agent, or Firm* — Nalay S. Dalal

(57) ABSTRACT

A novel fail-safe temperature monitoring system that can distinguish excessive chemical adsorbent temperature from temperature sensing component failure is provided. This system prevents the gas purifier from shutting down as a result of temperature sensing component failure, and thereby prevents a false shutdown of a high-purity gas production plant.

18 Claims, 3 Drawing Sheets

Temperature Sensor/Temperature Sensor Signal Receiving Computer Card Logic

Ultra-High Purity Nitrogen Production System

Temperature Sensor/Temperature Sensor Signal
Receiving Computer Card Logic

SYSTEM FOR PREVENTING UNNECESSARY SHUTDOWN OF A HIGH-PURITY GAS PRODUCTION PLANT

RELATED APPLICATIONS

This application claims the benefit of U.S. Provisional Application Ser. No. 60/986,782, filed on Nov. 9, 2007, which is incorporated herein by reference.

FIELD OF THE INVENTION

This invention relates to the prevention of unnecessary purifier shutdown in an ultra high-purity gas production plant. In particular, the purifier is configured to include a novel fail-safe temperature monitoring system that can distinguish excessive chemical adsorbent temperature from component failure, thereby averting an unnecessary shutdown.

BACKGROUND OF THE INVENTION

The manufacture of electronic components, such as semiconductor wafers, liquid crystal displays, light emitting diodes and solar cells typically requires nitrogen containing ten parts per billion (ppb) or less of several contaminants, including carbon monoxide, hydrogen, and oxygen. Nitrogen containing contaminants at these levels is referred to as ultra-high purity nitrogen. Ultra-high purity nitrogen is used, for example, to generate a contaminant-free atmosphere during various electronic component processing steps, thereby minimizing the number of defects in the product manufactured.

The base material utilized in the production of ultra-high purity nitrogen is air. Although the system is described with reference to nitrogen, any number of gases such as helium, hydrogen, oxygen, argon and rare gases may be employed. With reference to FIG. 1, a conventional system 100 is depicted. Air is introduced into compressor 110 where it is compressed to a pressure ranging from 35 psig to 200 psig. The resulting high pressure air stream is fed to an adsorption system 120, which contains two or more beds arranged in parallel. Adsorption system 120 typically operates at or near ambient temperature and removes high boiling point contaminants such as water and carbon dioxide. The resulting purified air is routed to a cryogenic air separation unit 130 that contains, for example, at least one distillation column and removes the preponderance of moderate boiling point contaminants such as oxygen. The nitrogen stream which exits the air separation unit is a conventional purity nitrogen stream and typically contains 1-10 parts per million (ppm) oxygen, 1-10 ppm carbon monoxide and 1-10 ppm hydrogen. The air separation unit also produces an oxygen-containing stream that may be utilized in part to remove contaminants from adsorption system 120.

The conventional purity nitrogen stream is further purified in chemical adsorption based gas purifier 140. This gas purifier typically contains a chemical adsorbent that is based on a metal, such as nickel, and reacts with and/or adsorbs any residual oxygen, hydrogen and carbon monoxide. Contaminants that have reacted with or adsorbed on the metal based catalyst are removed in a regeneration step by reaction and thermal desorption using a heated hydrogen/ultra-high purity nitrogen mixture. Typically, 1-10% of the ultra-high purity nitrogen stream is employed for this purpose. The nitrogen/hydrogen/contaminant mixture exiting the chemical adsorption based purification system 140 is discarded.

The ultra-high purity nitrogen stream generated in the purifier is then routed to filter system 150 to remove any particulates, and thereafter the ultra-high purity nitrogen stream is routed to the point of use.

The conventional purity nitrogen stream exiting the air separation unit 130 can be compromised, for example, by air entering the system, before the stream reaches the gas purifier 140. A high concentration of some contaminants/impurities, such as oxygen, can create an exothermic reaction. As a result, the chemical adsorbent in gas purifier 140 reaches temperatures exceeding a predetermined value, typically ranging between 120° F. and 400° F. In this situation, the gas purifier 140 is taken off-line and ultra-high purity nitrogen flow to the end user is discontinued. Because the end user does not receive ultra-high purity nitrogen when this occurs, a substantial economic loss is incurred.

Various attempts have been made to monitor the temperature in the gas purifier, so as not to allow the chemical adsorbent to exceed a specified temperature. Lorimer et al in U.S. Pat. Nos. 6,068,685; 6,156,105; 6,232,204; and 6,398,846 disclose a gas purifier including a getter column having a metallic vessel and a containment wall extending between the inlet and the outlet. The getter material purifies gas flowing therethrough by adsorbing impurities therefrom. A first temperature sensor is located in the top portion of the getter material and a second temperature sensor is located in the bottom portion of the getter material to rapidly detect the onset of an exothermic reaction which indicates the presence of excessive impurities in the gas which is to be purified.

Christel, Jr. et al in U.S. Pat. No. 4,832,711 describes a system for adsorbing water vapor from a mixture thereof with a second gas to reduce the water vapor or first gas concentration in the mixture to below a permissible maximum concentration by sensing the advance of the temperature front that precedes the adsorption front.

Harrison in U.S. Pat. No. 4,816,043 discloses the selective separation or fractionation of components from a fluid or gas mixture, for example, water from a pressurized air stream, using a desiccant. The remaining desiccant capacity is determined by sensing the advance of the temperature front that precedes the adsorption front.

It is increasingly desirable to design a gas purifier system in which equipment failure (i.e., temperature sensor, computer card, etc.) is distinguished from a real event (i.e., exothermic reaction within the purifier) which would necessitate the isolation of the purifier, and in turn discontinuation of the supply of purified gas to the end user.

SUMMARY OF THE INVENTION

According to one embodiment, the present invention is directed to a novel fail-safe temperature monitoring system that can distinguish excessive chemical adsorbent temperature from component failure, preventing unnecessary shutdown.

BRIEF DESCRIPTION OF THE DRAWINGS

The objects and advantages of the invention will be better understood from the following detailed description of the preferred embodiments thereof in connection with the accompanying figures wherein like numbers denote same features throughout and wherein.

DETAILED DESCRIPTION OF THE INVENTION

Figure 1:
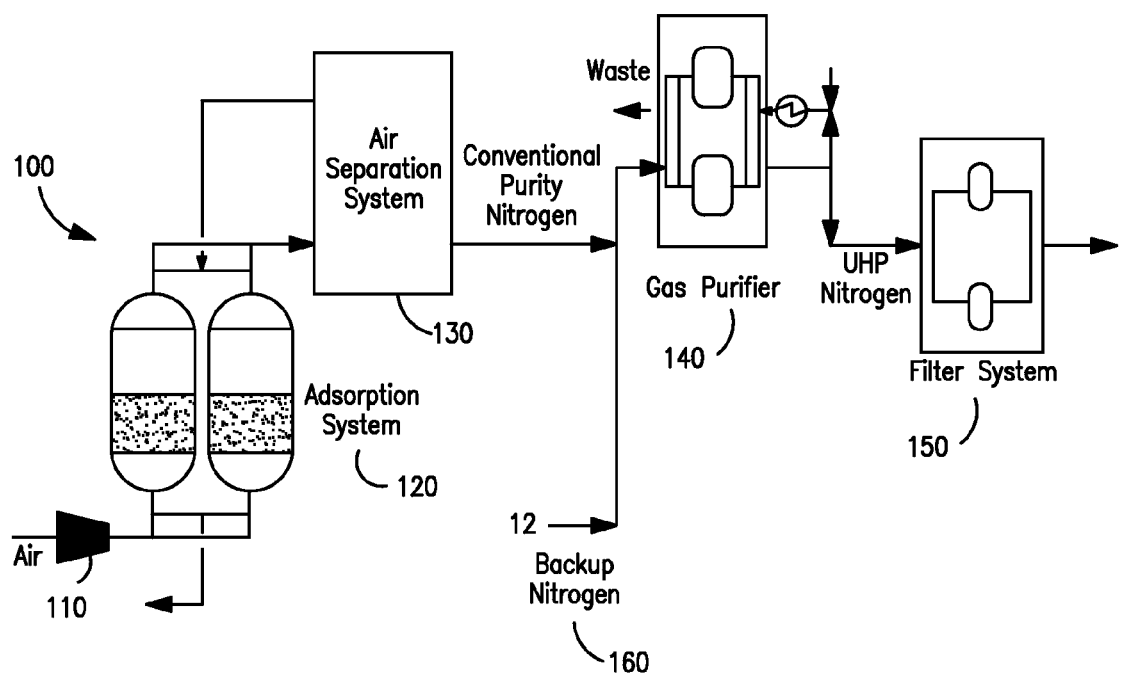
FIG. 1 is a schematic representation of a conventional ultra-high purity nitrogen system.
Figure 2:
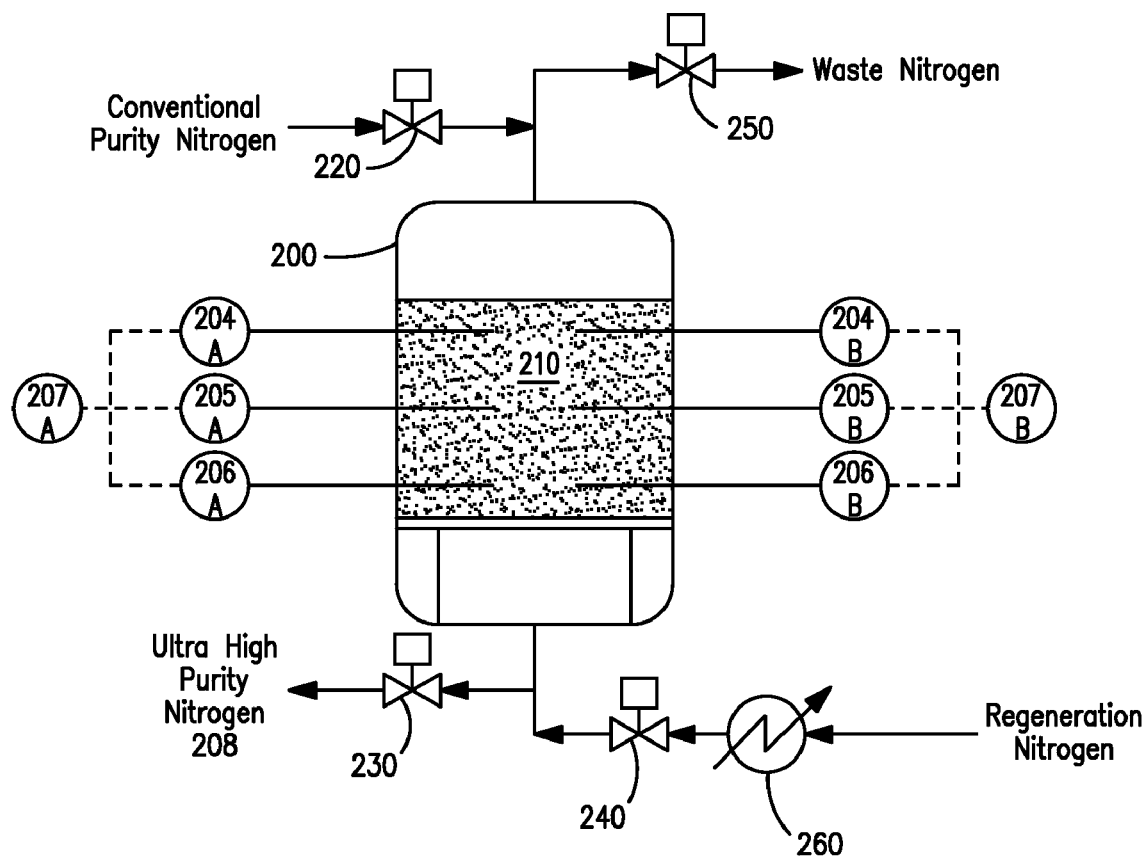
FIG. 2 is schematic diagram of a gas purifier utilized in an ultra high-purity nitrogen production system, with dual chemical adsorbent temperature sensors in accordance with an embodiment of the present invention.

The present invention provides a system which eliminates the need to isolate the gas purifier in the event of equipment malfunction or otherwise a false alarm. With reference to FIG. 2, a gas purifier 200, which may be utilized in system 100 is provided. Purifier 200 can be configured as a column, having a chemical adsorbent bed therein. A conventional purity gas stream such as nitrogen enters purifier 200 and is exposed to chemical adsorbent bed 210, which removes contaminants such as hydrogen, carbon monoxide and oxygen. The chemical adsorbent can be made from nickel, palladium or any other material that is sensitive or selective to the impurities removed and retains same.

The chemical adsorbent bed is designed to include at least one dual temperature sensor 204, 205, 206 that is located in close proximity to the adsorbent bed, but at various locations therein. The temperature sensors may be resistance-based devices, such as resistance temperature detectors (RTDs) or thermocouples. These devices are inserted into the chemical adsorbent bed 210 through thermal wells, which are permanent tubular devices that project into the bed, and minimize the interference with the gas flow. The temperature sensors may also be located on the wall of the purifier bed. Typically, more than one temperature sensor is utilized so that excessive temperature is quickly detected at the various locations within the bed. High chemical adsorbent temperatures are indicative of the bed being exposed to excessive contaminant levels. The temperature measured by sensors 204, 205, 206 is transformed into an electrical signal which is sent to a receiving computer card. In the event the computer registers a temperature in excess of the predetermined value, typically between 120° F. and 400° F., adsorbent bed 210 is isolated by closing valves 220, 230, 240, and the bed is vented to atmosphere or an abatement system (not shown) by opening valve 250.

The failure of temperature sensing equipment, such as thermocouples and thermocouple computer boards, generate an electrical signal that is similar in magnitude to that generated by a high temperature reading. Therefore, the computer interprets failed temperature sensing equipment in the same manner as a high temperature reading, causing the purifier to shutdown as described above. Such a shutdown is unnecessary, because the chemical adsorbent temperature is not excessive.

The present invention addresses the need to distinguish between temperature sensing equipment failure and excessive chemical adsorbent temperature. In an exemplary embodiment, dual temperature sensor sets 204A and 204B; 205A and 205B; 206A and 206B; can be utilized to detect the temperature at various locations in the bed. For example, one set of temperature sensors can be disposed in close proximity to the top of the purifier bed, while the others may be place near the center of the purifier, and in close proximity to the bottom of the purifier, respectively. Utilizing dual temperature sensors in the manner explained below provides a means to distinguish a failure of the equipment (i.e., temperature sensor, computer card, etc.) from a real event such as temperature rise in the chemical adsorbent bed above a predetermined level. The latter would lead to the destruction of the chemical adsorbent, which could cause corrosive substances such as hydrochloric or sulfuric acid to be released from the purifier. Without this distinction, gas purifier 200 would need to be shut down (i.e., taken off-line) regardless of whether or not a real event were occurring.

With continued reference to FIG. 2, conventional purity nitrogen is provided from an air separation unit 140, or a backup source 160 to gas purifier 200 at near ambient temperature and a pressure ranging from about 10 psia to 200 psia, preferably 50 psia to 180 psia and most preferably 100 psia to 170 psia. The flow rate of the incoming stream ranges from ranging from 1,000 cfh-NTP to 1,000,000 cfh-NTP, preferably between 5,000 cfh-NTP and 750,000 cfh-NTP and most preferably between 10,000 cfh-NTP and 500,000 cfh-NTP, and contains between 0.1 and 10 part per million each of hydrogen, carbon monoxide and oxygen.

The conventional purity nitrogen gas stream enters gas purifier 200, and is passed through and exposed to the chemical adsorbent bed 210. The adsorbent bed typically contains a nickel based chemical adsorbent. Examples of other chemical adsorbents that can be employed include but not limited to palladium, zirconium, platinum, rhodium, ruthenium, and titanium-based or other materials that are selective toward particular contaminants. The metal based chemical adsorbent reacts with and/or adsorbs residual oxygen, hydrogen and carbon monoxide, thereby removing them from the conventional purity nitrogen gas stream and producing an ultra-high purity nitrogen gas stream. This ultra-high purity nitrogen gas stream exits the chemical adsorbent bed typically containing between 0 and 20 parts per billion each of hydrogen, carbon monoxide and oxygen, preferably containing between 0 and 10 parts per billion each of hydrogen, carbon monoxide and oxygen and most preferably containing between 0 and 1 part per billion each of hydrogen, carbon monoxide and oxygen.

The gas purifier is designed to include at least one dual temperature sensor set 204A and 204B; 205A and 205B; 206A and 206B that is located in proximity to the chemical adsorbent 210, as discussed above. These temperature sensors are relatively fragile and could break as the chemical adsorbent shifts during the transition from purification to regeneration and back. Moreover, the temperature sensors need to be removed and replaced whenever they fail. As a result, the temperature sensors/detectors are inserted into the chemical adsorbent bed 210 through thermal wells, which project into the bed. The dual temperature sensors can be placed in one or several thermowells.

The dual temperature sensors are used as part of a set so that temperature sensor failure can be detected while eliminating a false or misleading indication of a high chemical adsorbent temperature. The distinction between a temperature sensor failure and a high chemical adsorbent temperature is made by determining the temperature difference between the two temperature sensors in a given dual temperature sensor set. If both temperature sensors are functioning properly, this temperature difference should be small, since the temperature sensors in a given set (for example, 204A and 204B) are located in close proximity to one other. Typically, the distance between the temperature sensors is between 0 and 6 inches, preferably between 0 and 3 inches and most preferably between 0 and 1 inch. However, if the difference in measured temperature between two temperature sensors in a given set (for example, 204A and 204B) exceeds a first predetermined value, typically between 5° F. and 100° F., preferably between 10° F. and 40° F. and most preferably between 10° F. and 25° F., one of the temperature sensors is determined to have failed and an alarm is initiated.

A high chemical adsorbent temperature is not found to have occurred unless both temperature sensors in a given dual thermocouple set indicate a temperature that exceeds a second predetermined value. Specifically, each temperature sensor in the dual temperature sensor set 204A and 204B; 205A and 205B; 206A and 206B generates an electric signal that is sent to a temperature sensor signal receiving computer card 207A and 207B. The temperature sensors associated with each dual temperature sensor set are wired to separate temperature sensor signal receiving computer cards. In this embodiment, temperature sensors 204A, 205A and 206A are wired to temperature sensor signal receiving computer card 207A and temperature sensors 204B, 205B and 206B are wired to temperature sensor signal receiving computer card 207B. In order to initiate a gas purifier shutdown, at least one temperature sensor must indicate a temperature that exceeds the second predetermined value on each temperature sensor signal receiving computer card. The second predetermined value is typically between 120° F. and 400° F., preferably between 150° F. and 350° F. and most preferably between 150° F. and 300° F.

Figure 3:
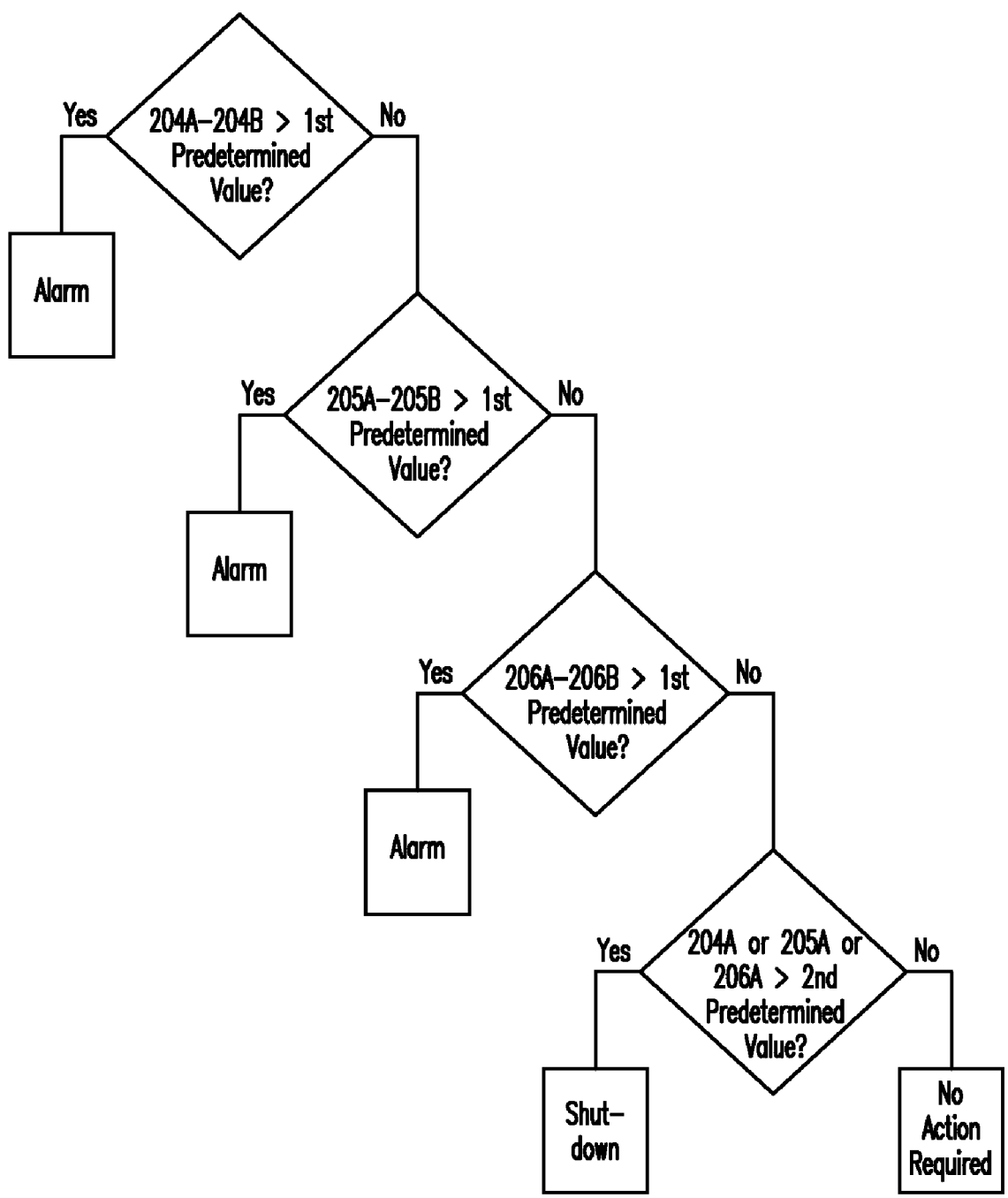
FIG. 3 illustrates a logic control flow diagram for the dual temperature sensors of the chemical adsorbent bed that is the subject of the present invention.

The temperature sensor and temperature sensor signal receiving computer card logic is illustrated in FIG. 3. Referring to this figure, the temperature difference between temperature sensors 204A and 204B is determined. If this difference exceeds the first predetermined value, one of the temperature sensors or the temperature sensor signal receiving computer card has failed and an alarm is sounded. In this situation the operator, would access the gas purifier and change out the malfunctioning equipment without having to take the purifier off-line. On the other hand, if the temperature difference does not exceed the first predetermined value, the temperature difference between sensors 205A and 205B is determined. If this difference exceeds the first predetermined value, one of the temperature sensors or the temperature sensor signal receiving computer card has failed and an alarm is sounded, and the procedure outlined above can be carried out. If this difference does not exceed the first predetermined value, the temperature difference between sensors 206A and 206B is determined. If the temperature difference exceeds the first predetermined value, one of the temperature sensors or the temperature sensor signal receiving computer card has failed and an alarm is sounded. If this difference does not exceed the first predetermined value, the actual value of the temperature readings is examined. If the temperature measured by at least one of the dual thermocouple in the dual set exceeds the second predetermined value, the chemical adsorbent temperature is too high and the gas purifier is isolated. The chemical adsorbent bed 210 is isolated by closing valves 220, 230 and 240. The chemical adsorbent bed may also be vented by opening valve 250. If the temperature readings do not exceed the second predetermined value, the gas purifier is operating normally and no action is taken. The logic illustrated in FIG. 3 is programmed into a computing device that contains the temperature sensor signal receiving computer cards. This device is typically a computer or programmable logic controller (PLC).

Because at least one temperature sensor must indicate an excessive temperature on each temperature sensor signal receiving computer card to initiate a gas purifier shutdown, a single temperature sensor or temperature sensor signal receiving computer card failure will not cause the gas purifier to isolate. Typically, the system is designed such that a single temperature sensor or temperature sensor signal receiving computer card failure will initiate an alarm to notify the operator that the failure has occurred.

The chemical adsorbent requires periodic regeneration. Referring again to FIG. 2, the regeneration nitrogen is heated in a heat exchanger 260, typically to a temperature between 400° F. and 800° F., preferably to a temperature between 400° F. and 700° F. and most preferably to a temperature between 400° F. and 600° F. The hot regeneration nitrogen stream is routed to the purifier 200 where it drives contaminants off of the chemical adsorbent 210. Generally, the contaminant-containing regeneration nitrogen is circulated counter to the direction in which the production gas is purified, and exits purifier 200 as waste. The temperature of the regeneration stream generally exceeds the temperature that initiates a chemical adsorbent bed shutdown. Therefore, the chemical adsorbent bed high temperature shutdown is disregarded during regeneration. However, a single temperature sensor or temperature sensor signal receiving computer card failure can still be detected because these are identified based on temperature difference, not absolute temperature.

While the invention has been described in detail with reference to specific embodiments thereof, it will become apparent to one skilled in the art that various changes and modifications can be make, and equivalents employed.

What we claim is:

1. A system for preventing an equipment failure from a potentially catastrophic exothermic reaction in a gas purifier bed, comprising:
   providing one or more dual temperature sensors at various locations in the purifier bed having one or more inlet and outlet valves and, wherein a first set of temperature measuring devices are disposed in close proximity to a corresponding second set of temperature measuring devices forming part of each individual dual temperature sensor;
   selecting a first predetermined temperature differential between a first and second temperature measuring device for each individual dual temperature sensor;
   selecting a second predetermined temperature;
   preventing failure by shutting down the gas purification bed upon determining that the differential between the first and the second temperature measuring device in each of the dual temperature sensors is below the first predetermined temperature differential but wherein the first and the second temperature measuring device of any of said dual temperature sensors exceeds the second predetermined temperature, thereby closing the inlet and the outlet valves to isolate the bed.

2. The system of claim 1, wherein three dual temperature sensors employed are disposed at an upper part, middle part, and lower part of the gas purifier bed.

3. The system of claim 1, wherein the first set of temperature measuring devices are connected to a first receiving computer card, and the second set of temperature measuring devices are connected to a second computer card.

4. The system of claim 1, wherein the gas purifier bed is taken off line upon exceeding the first predetermined temperature differential and the second predetermined temperature set point.

5. The system of claim 1, wherein the first predetermined temperature differential is determined by a temperature difference between two temperature measuring devices of each individual dual temperature sensor.

6. The system of claim 1, wherein the first predetermined temperature differential ranges from about 5° F. to about 100° F.

7. The system of claim 1, wherein the second predetermined set point temperature ranges from 120° F. to about 400° F.

8. An apparatus designed for preventing failure in a gas purification bed due to an exothermic reaction, comprising:

a gas purification bed having one or more inlet and outlet valves and one or more dual temperature sensors at various locations in the gas purification bed, each of the one or more dual temperature sensors having two temperature measuring devices in close proximity to one another;

the two temperature measuring devices in each of the one or more dual temperature sensors being connected to separate temperature receiving computer cards; and a program logic controller configured to monitor an exothermic reaction in the gas purification bed based on (i) a first predetermined temperature differential between the temperature measuring devices of each dual temperature sensor; and (ii) temperatures measured by the two measuring devices of one of said dual temperature sensors exceeding a second predetermined temperature;

wherein the program logic controller is configured for preventing failure by shutting down the gas purification bed upon the controller determining that the differential between the two temperature measuring devices in each of the one or more dual temperature sensors is below the first predetermined temperature differential but wherein the two measuring devices of any of the dual temperature sensors exceeds the second predetermined temperature, thereby causing the controller to transmit a signal to close the inlet and the outlet valves to isolate the bed.

9. The apparatus of claim 8, further comprising three dual temperature sensors disposed at an upper part, middle part, and lower part of the gas purification bed, respectively.

10. The apparatus of claim 8, wherein the temperature sensors are disposed in thermal wells within the purifier bed.

11. The apparatus of claim 8, wherein each temperature measuring device of a dual temperature sensor is placed in a single or separate thermowells.

12. The apparatus of claim 8, wherein the temperature measuring devices are located on the wall of the purifier bed at an upper part, middle part, and lower part of the gas purifier bed.

13. The apparatus of claim 8, further comprising a source of conventional purity nitrogen gas upstream of the gas purification bed having oxygen, carbon monoxide, and hydrogen impurities in an amount ranging from about 0.1 to about 10 ppm.

14. The apparatus of claim 8, further comprising an isolation valve between the source of conventional nitrogen gas and the gas purification bed which is controlled by the program logic controller to isolate the gas purification bed upon exceeding the first predetermined temperature differential and the second predetermined set point temperature.

15. The apparatus of claim 8, wherein upon exceeding the first predetermined temperature of an individual dual temperature sensor, an alarm is triggered and the program logic controller alerts the operator to an equipment failure of said dual temperature sensor.

16. The system of claim 8, wherein the gas purifier bed contains a chemical adsorbent selected from the group consisting of nickel, palladium, zirconium, platinum, rhodium, ruthenium, and titanium.

17. The system of claim 8, further comprising a source of conventional nitrogen gas upstream of the gas purification bed having oxygen, carbon monoxide and hydrogen impurities in an amount ranging from 0.1-10 ppm.

18. The system of claim 8, wherein the gas purifier bed further purifies the conventional purity nitrogen gas stream to an ultra-high-purity level having oxygen, carbon monoxide and hydrogen impurities in an amount ranging 0-20 ppb.

* * * * *